United States Patent [19]
Maurer

[11] Patent Number: 5,644,285
[45] Date of Patent: Jul. 1, 1997

[54] PRESSURE TRANSDUCER WITH MEDIA ISOLATION

[75] Inventor: D. Joseph Maurer, Pearl City, Ill.

[73] Assignee: Honeywell Inc., Minneapolis, Minn.

[21] Appl. No.: 382,272

[22] Filed: Feb. 1, 1995

[51] Int. Cl.⁶ ........................................................ G01L 1/22
[52] U.S. Cl. ........................ 338/39; 338/4; 338/42; 73/746
[58] Field of Search ........................ 338/4, 5, 36, 39, 338/42, 47; 73/744, 746

[56] References Cited

U.S. PATENT DOCUMENTS

| | | | |
|---|---|---|---|
| 3,167,963 | 2/1965 | Boonshaft | 73/726 |
| 3,293,916 | 12/1966 | Goff | 73/726 |
| 3,461,416 | 8/1969 | Kaufman | 338/4 |
| 3,970,982 | 7/1976 | Kurtz et al. | 338/4 |
| 4,034,610 | 7/1977 | Biddle et al. | 73/725 |
| 4,449,113 | 5/1984 | Gould et al. | 338/39 |
| 4,512,199 | 4/1985 | Woodward et al. | 73/725 |
| 4,545,389 | 10/1985 | Schaberg et al. . | |
| 4,602,513 | 7/1986 | Hirota et al. | 73/725 |
| 4,653,329 | 3/1987 | Sagara et al. | 73/726 |
| 4,656,454 | 4/1987 | Rosenberger . | |
| 4,683,894 | 8/1987 | Kodama et al. . | |
| 5,156,052 | 10/1992 | Johnson et al. . | |
| 5,184,107 | 2/1993 | Maurer . | |
| 5,327,785 | 7/1994 | Maurer . | |
| 5,351,550 | 10/1994 | Maurer . | |
| 5,353,003 | 10/1994 | Maurer . | |
| 5,483,994 | 1/1996 | Maurer | 138/31 |

*Primary Examiner*—Teresa J. Walberg
*Assistant Examiner*—Karl Easthom
*Attorney, Agent, or Firm*—William D. Lanyi

[57] ABSTRACT

A pressure sensor die is provided with a flexible membrane and a plunger which combine to amplify a low pressure signal while also providing media isolation between a fluid being measured and the internal components of a pressure sensor. One embodiment of the pressure sensor disposes an end of the plunger in direct contact with a pressure sensor die while another embodiment disposes an elastomeric diaphragm between the plunger and the pressure sensor die. This second embodiment creates a chamber between the plunger and the pressure sensor die in which a fluid is captured by movement of the plunger. The captured fluid is decreased in volume by movement of the plunger and the resulting increase in pressure in transmitted to a pressure sensitive portion of a pressure sensor die. The device is particularly useful in conjunction with applications where media isolation is required between the fluid being measured and the components of the pressure sensor, such as kidney dialysis machines. It is also particularly useful where electrical isolation is required to prevent any possible shock hazard that could otherwise result from fluid communication between the fluid being measured and the electrically conductive portions of the pressure sensor. One embodiment of the pressure sensor comprises a means for preloading a pressure sensor die at atmospheric pressure in order to permit the device to measure both positive and negative pressures within the first chamber.

14 Claims, 10 Drawing Sheets

PRESSURE TRANSDUCER WITH MEDIA ISOLATION

BACKGROUND OF THE INVENTION

1. Field of the Invention

The present invention relates generally to pressure transducers and, more particularly, to a pressure transducer which is suitable for use with very low pressure fluids in applications where media isolation is required between the fluid being measured and the transducer.

2. Description of the Prior Art

Many different types of pressure transducers are known to those skilled in the art. Some types of pressure transducers use a silicon die that is provided with one or more piezoresistive elements. When the piezoresistive elements are distorted in response to changes of pressure imposed on the die, the change in resistance of the piezoresistor can be used to provide a signal that represents the pressure. In some types of pressure dies, the piezoresistive elements are disposed on a diaphragm portion of the die that is formed by etching the die.

In some applications, the pressure transducer is used to measure the pressure of a fluid that is flowing through a conduit. When transducers are used in this type of application, the fluid being measured can be a body fluid such as blood. In applications of this type, it is necessary to provide some means to prevent transmission of disease from one patient to another patient that could occur as a result of contamination of the pressure transducer.

U.S. patent application Ser. No. 08/265,472 (M10-15752), which was filed on Jun. 24, 1994 and assigned to the assignee of the present application, discloses a flowthrough pressure sensor which avoids the creation of crevices and creases that could create regions of the pressure sensor that are difficult to clean. The pressure sensor is particularly adapted for use in applications that require cleansing to avoid the build up of bacterial-laden material. The flowthrough pressure sensor is particularly adapted for use in the measurement of bodily fluids. A first conduit is connected in fluid communication with the second conduit which, in turn, is associated with a pressure sensitive element and two compressible seals. A housing member is provided with an opening into which the compressible seals in the pressure sensitive element are disposed. A latching mechanism is provided to force the housing against a boss portion of the first conduit so that the seals and the pressure sensitive element are compressed therebetween.

U.S. Pat. No. 4,656,454, which issued to Rosenberger on Apr. 7, 1987, describes a piezoresistive pressure transducer with elastomeric seals. The transducer is adapted for automatic assembly and a method of producing the transducer is also described. A piezoresistive stress sensitive element in the form of a diaphragm of semiconductor material having a thickened rim is held at its rim between a pair of premolded elastomeric seals in a thermoplastic housing. Electrical connections with external circuitry are made with strain relief jumpers which connect conductive regions on the element outside the seals to conductors which pass through the housing wall.

U.S. Pat. No. 5,156,052, which issued to Johnson et al on Oct. 20, 1992, describes a ribbed and bossed pressure transducer which has means for improving the linearity and sensitivity of the output signal from the pressure transducer. Ribs and bosses are introduced in the diaphragm region to collect the moments caused by a difference in pressure on the two sides of the diaphragm and thus improves device sensitivity. In addition, the ribs and bosses prevents stretching of the piezoresistors. This improves the linearity of the device. A constraint can be included to improve the alignment of the piezoresistors and thus improve the linearity of the device.

U.S. Pat. No. 5,184,107, which issued to Maurer on Feb. 2, 1993, discloses a piezoresistive pressure transducer with a conductive elastomeric seal. A piezoresistive stress sensitive element in the form of a diaphragm of semiconductor material having a thickened rim is held at its rim between a pair of premolded elastomeric seals in a two piece housing. Electrical connection with external circuitry are made by conductive paths through one of the elastomeric seals which makes contact with electrical leads which pass through the housing wall.

U.S. Pat. No. 5,327,785, which issued to Maurer on Jul. 12, 1994, describes a pressure sensor with improved heat dissipation characteristics. The sensor is provided with a means for efficiently removing heat from a circuit portion of a sensor die by providing an resilient member between a first surface of the sensor die and electrical leads. A thermally conductive, but electrically insulative, portion of the resilient member is disposed between the circuit portion of the sensor die and the leads and a means is provided for urging the first surface of the sensor die into thermal communicating contact with the thermally conductive portion of the resilient member.

U.S. Pat. No. 5,353,003, which issued to Maurer on Oct. 4, 1994, describes a force sensor which incorporates a pressure transducer disposed within a housing structure. A force transmitting means, such as a shaft slideable within an opening, is provided to communicate force from an external source to a diaphragm of a pressure sensor. An elastomeric conductor is disposed between the electronic components on the diaphragm of a pressure sensor die and conductive leads that are used to communicate signals from the pressure sensor die to components external to the force sensor.

U.S. Pat. No. 4,545,389, which issued to Schaberg et al on Oct. 8, 1985, describes a disposable physiological pressure sensing system which includes a sterile throwaway pressure transducing device. The device includes a pressure transducer mounted together with a flow control valve in a housing. The device includes a first connector for connecting the device to a source of sterile solution, a second connector for electrically connecting the pressure transducer to a monitoring device and a third connector for selectively connecting the device to a catheter inserted into a patient's circulatory system. The device, including the connectors, is made to be low cost so as to permit the entire device to be installed and discarded as a unit so as to constitute a throwaway pressure sensing and flow regulating means. A number of different embodiments of the pressure transducer are disclosed, each of which constitutes a low costs, accurate pressure transducing means arranged to have high electrical isolation relative to the fluid in a pressure chamber of the housing. The pressure of the fluid is continuously sensed by the transducer. In one embodiment, the force collector for transmitting the pressure force to the strain gage is formed as a one-piece unit. In a number of the embodiments, the elements are formed separately and bonded together.

U.S. Pat. No. 4,683,894, which issued to Kodama et al on Aug. 4, 1987, discloses a disposable physiological pressure sensing system. The device includes a first connector for connecting the device to a source sterile solution, a second connector for electrically connecting the pressure transducer to a monitoring device, and a third connector for selectively connecting the device to a catheter inserted into a patient's circulatory system. The pressure transducer includes a novel mounting of the strain gage beam to the isolator which has been found to effectively avoid cracking and breaking of the beam from the stress forces applied thereto in the operation of the device. In the illustrated embodiment, the lower surface of the beam is secured to the upper surface of the isolator, and the upper surface of the beam is engaged by a link connected to a displaceable diaphragm. The isolator is connected by a pair of supports to a frame such that thermally induced stresses in the frame do not affect the zero point of the strain gage.

U.S. Pat. No. 5,351,550, which issued Maurer on Oct. 4, 1994, describes a pressure sensor that is adapted for use with a component carrier. The transducer is provided with a housing member that attached to a rigid and generally planar member, such as a ceramic circuit board. The legs of the housing member can pass through holes in the circuit board or, alternatively, can attach to edges thereof. The legs of the housing are provided with bails which have steps shaped to cease the circuit board after the legs are flexed to permit insertion of the board between them. The housing is provided with an opening that is shaped to receive a media seal, a pressure sensor die and a conductive seal between a surface of the opening and a surface of the ceramic circuit board. An alternative embodiment of the pressure sensor comprises two housing members that are attached to opposite sides of the same circuit board so that a differential pressure can be measured.

Although several techniques have been developed to prevent contamination of the transducer by the fluid being measured, it would be significantly beneficial if a pressure transducer could be developed which completely prevents contact between the fluid being measured and the pressure transducer. In addition, it would be significantly beneficial if a means were developed to amplify the signal when the fluid being measured is of a low pressure. In the prior art, inexpensive low pressure sensors are limited on the electrical signal that can be generated without additional signal amplification. Typically, the output signal of the pressure transducer can be increased by the addition of an amplification circuit. However, this adds costs to the transducer and can amplify error signals in ultra low pressure applications. When devices of this type are used in medical, appliance, industrial and automotive applications, there is an added need for providing media isolation. The media isolation not only is needed when the fluid being measured can possibly contain contaminates such as disease, but also in applications where the fluid being measured is electrically conductive and might present a shock hazard if the fluid comes into direct contact with the electrically conductive portions of the transducer.

SUMMARY OF THE INVENTION

A preferred embodiment of the present invention provides a pressure sensor that comprises a housing member having first and second chambers formed therein. A flexible membrane is disposed between the first and second chambers and a first conduit extends through the housing member. The first conduit is connected in fluid communication with the first chamber.

A tubular opening is formed in the housing member of the pressure sensor and a plunger is slideably disposed within the tubular opening. The plunger has a first end and a second end. The first end of the plunger is disposed within the second chamber proximate the flexible membrane. The plunger is movable within the tubular opening in response to movement of the flexible membrane. A pressure sensor die is disposed within the housing member proximate the second end of the plunger and the pressure sensor die has a deformable portion which is deformable in response to movement of the plunger.

The first end of the plunger can be attached to the flexible membrane, but this is not a necessary characteristic of the present invention. In addition, in certain embodiments of the present invention, the plunger can have a first end that is larger in diameter than the second end. Certain applications of the present invention may find a need to use a plunger in which the second end has a larger cross sectional area than the first end. The second end of the plunger can be disposed in direct contact with the pressure sensor die, but this is not a requirement of the present invention in all of is embodiments. In addition, a preferred embodiment of the present invention utilizes a pressure sensor die that is made of silicon with a plurality of piezoresistors disposed thereon. The silicon pressure sensor die can have a portion of its structure that is etched to provide a thinned diaphragm in the region where the piezoresistors are located. However, certain embodiments of the present invention can use a pressure sensor die that is not etched to provide a diaphragm portion. In this type of embodiment, the entire pressure sensor die is deformed in response to changes in pressure within the first chamber and the resulting deformation of the flexible membrane which causes the plunger to slide within the tubular opening. The tubular opening in a most preferred embodiment of the present invention, is generally circular in cross section. However, the tubular opening can have cross sections that are different shapes, depending on the shape of the plunger.

In certain embodiments of the present invention, the second end of the plunger is disposed proximate an elastomeric diaphragm that is disposed between the second end of the plunger and the deformable portion of the pressure sensor die. The elastomeric diaphragm can be provided with an opening that is formed through its thickness. The diaphragm opening is disposed proximate the second end of the plunger and the plunger is movable into direct contact with the opening of the elastomeric diaphragm in response to movement of the flexible membrane. When the second end of the plunger moves into contact with the opening, it can block the opening and form a sealed third chamber between the elastomeric diaphragm and the pressure sensor die. When the plunger continues to move downward toward the pressure sensor die, the trapped fluid within the third chamber increases in pressure and this increased pressure is sense by the movement of the pressure sensor die and the resulting deformation of the piezoresistors.

Although certain embodiments of the present invention incorporate the third chamber described above, it should be understood that this is not a necessary characteristic of the present invention. Instead, the second end of the plunger can be disposed proximate the pressure sensor die.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Throughout the Description of the Preferred Embodiment, like components will be identified by like reference numerals.

Figure 1:
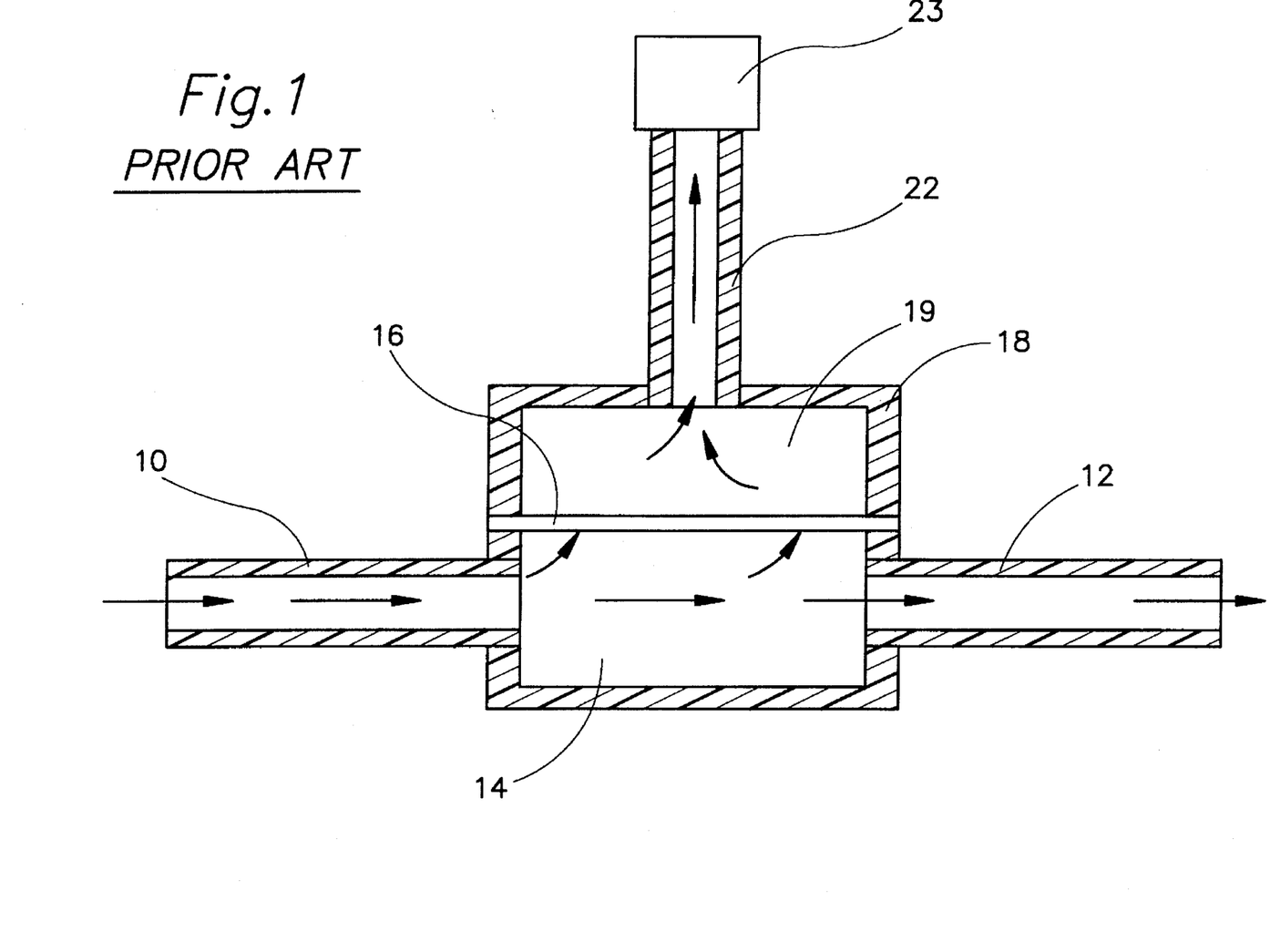
FIG. 1 illustrates a pressure sensor known to those skilled in the art.

FIG. 1 illustrates one type of flowthrough pressure with media isolation that is known to those skilled in the art. It is illustrated in FIG. 1 schematically to provide an illustration of the theoretical concept of the device. A flowthrough passage comprising conduits 10 and 12 which provide means by which a fluid can pass. The fluid passage comprising conduits 10 and 12 directs a fluid through a lower chamber 14. A diaphragm 16 is provided within the housing 18 and separates the lower chamber 14 from an upper chamber 19. Changes in pressure of the fluid within the lower chamber 14 can cause the diaphragm 16 to expand upward into the upper chamber 19. This upward deflection of the diaphragm 16 raises the pressure within the upper chamber 19. The increased pressure in the upper chamber 19 is communicated through a conduit 22 to a pressure transducer 23. The pressure transducer 23 can be calibrated to provide an output signal that is representative of the pressure in the lower chamber which is the same as the pressure flowing through conduits 10 and 12. Although the pressure transducer 23 directly reads the pressure within conduit 22 and the upper chamber 19, an initial calibration process can be used so that the transducer 23 also produces signals that have a known relationship to the actual pressure of the fluid passing through the conduits 10 and 12 and the lower chamber 14. The arrows in FIG. 1 illustrate both the direction along which the fluid is passing and the direction along which pressure is transferred through the diaphragm 16 and upper chamber 19.

Figure 2:
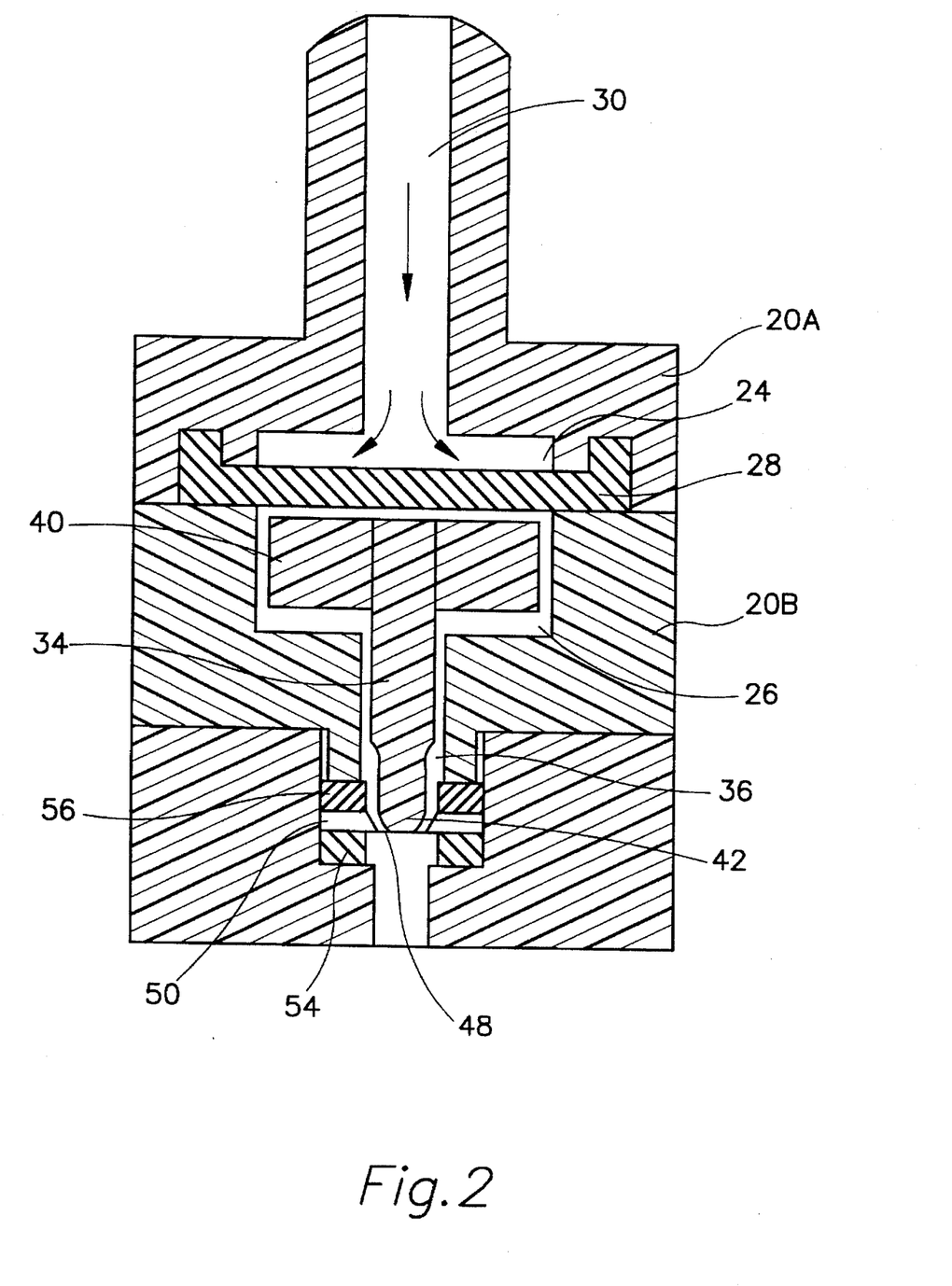
FIG. 2 is a first embodiment of the present invention.
Figure 4:
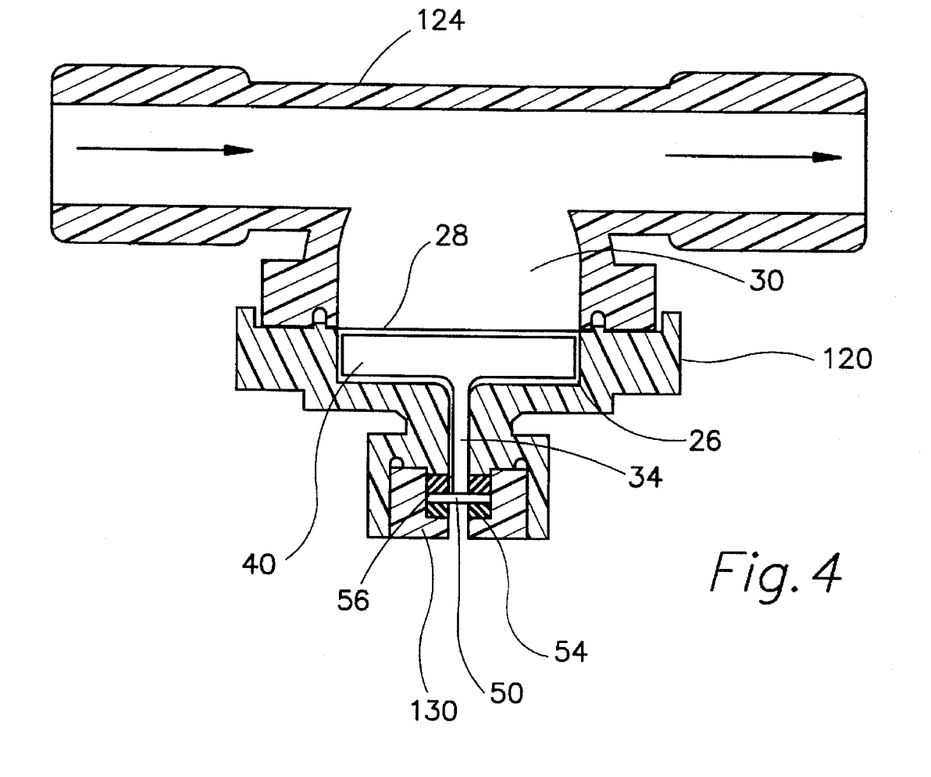
FIG. 4 is a flowthrough adaptation of the embodiment shown in FIG. 2 but with a slab die used instead of an etched diaphragm.
Figure 5:
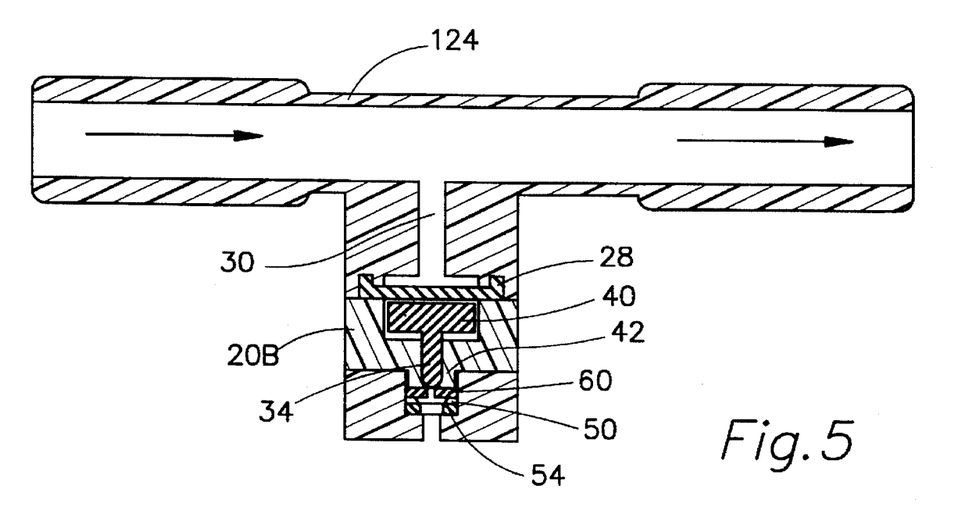
FIG. 5 is a flowthrough adaptation of the embodiment shown in FIG. 3.

In the description of the present invention below, FIGS. 2 and 3 will be used to illustrate the basic concepts of two embodiments of the present invention. FIGS. 4 and 5 will be used to describe particular applications of those concepts in flowthrough devices. FIG. 2 illustrates a housing which is formed as two portions, 20A and 20B. Within the housing, a first chamber 24 and a second chamber 26 are separated by a flexible membrane 28. In a preferred embodiment of the present invention, the flexible membrane 28 is made of a fluid impermeable substance such as an elastomer, polymer or metal or any other material that exhibits flexible characteristics. However, it should be understood that as long as the flexible membrane 28 is deformable in response to changes in the first chamber 24, it will serve its primary function. The first conduit 30 transmits pressure from an external source to the upper surface of the flexible membrane 28 and, in some embodiments, can be formed as part of the housing.

With continued reference to FIG. 2, a plunger 34 is disposed within a tubular opening 36 that is formed in the housing. The plunger 34 is disposed within the tubular opening in such a way that it is free to slide up or down in FIG. 2. In the embodiment shown in FIG. 2, the first end 40 of the plunger 34 is larger in cross sectional area than the second end 42 of the plunger. This difference in size between the first end 40 and the second end 42 of the plunger is used in some embodiments to mechanically amplify the signal of the pressure transducer in response to very low pressures in the first conduit 30 and the first chamber 24. The first end 40 of the plunger is disposed within the second chamber 26. When higher pressure is in chamber 24, a less sensitive pressure sensor die may be used to measure high pressures.

In the embodiment shown in FIG. 2, the second end 42 of the plunger is disposed in direct contact with a deformable portion 48 of a pressure sensor die 50. The pressure sensor die 50 is provided with a deformable portion 48, such as a diaphragm, that is formed by etching a cavity on the upper side of the pressure sensor die 50 shown in FIG. 2. A preferred embodiment uses piezoresistors to detect deformation, but any other type of component could be used to detect the movement or deformation of a pressure sensing component. Although not illustrated in FIG. 2, a plurality of piezoresistors are disposed on the lower side of the diaphragm 48 and changes in the resistance of those piezoresistors in response to deformation of the diaphragm provides the ability to create an output signal responsive to that deformation. A conductive seal 54 is disposed directly below the pressure sensor die 50 and a die support 56 is disposed directly above the pressure sensor die 50. The conductive seal 54 can be used to provide electrical contact between components on the lower surface of the pressure sensor die 50 and external leads. Since this technique of using a conductive seal in association with a pressure sensor die is well known to those skilled in the art and described above, that electrical communication is not illustrated in the figures and will not be described in detail. Similarly, since the use of piezoresistors is well known and difficult to illustrate in the Figures, they are not specifically shown.

With continued reference to FIG. 2, an increase in pressure within the first chamber 24 will cause the flexible membrane 28 to deflect downward into contact with the upper surface of the first end 40 of the plunger 34. This contact will create a downward force on the plunger 34 and cause it to move downward within the tubular opening 36. This downward movement will exert a force on the deformable portion 48 of the pressure sensor die 50 and produce an output signal from the pressure sensor die that is representative of the deformation caused in the deformable portion of the pressure sensor die 50.

The first end 40 of the plunger 34 provides several important functions. First, it can be shaped to be slightly smaller than the cross sectional shape of the second chamber 26. This serves the purpose of causing the plunger 34 to be properly aligned when it moves up and down within the housing. In addition, it provides a larger surface against which the flexible membrane 28 is in contact. Depending on the relative sizes of the second chamber 26, the first end 40 and the flexible membrane 28, it is sometimes beneficial to prevent severe buckling or distortion of the flexible membrane 28. In other words, if the cross sectional area of the first end 40 is significantly smaller than the second chamber 26, portions of the flexible membrane 28 may extrude into the opening between those components and adversely affect the reproducibility of movement in response to changes in pressure within the first chamber 24. With reference to FIG. 2, it can be seen that changes in pressure within the first conduit 30 and the first chamber 24 will cause a downward deflection of the flexible membrane 28. This downward deflection of the flexible membrane 28 will push against the first end 40 of the plunger 34 and cause the plunger to move downward within the tubular opening 36. This downward movement of the plunger 34 will press against the deformable portion of the pressure sensor die 50 and provide an output signal that is representative of the pressure within the first conduit 30.

Figure 3:
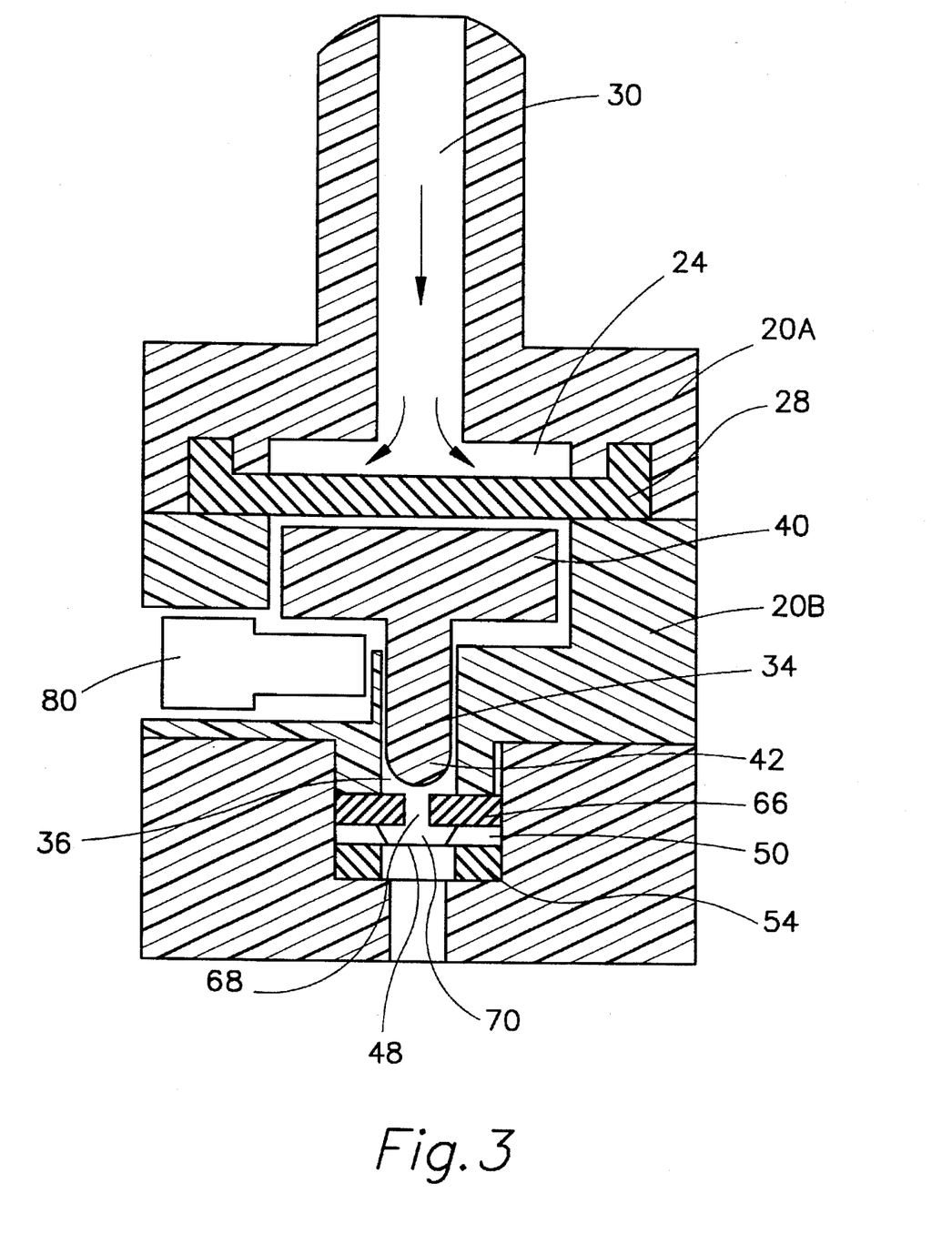
FIG. 3 is a second embodiment of the present invention.

FIG. 3 shows an alternative embodiment of the present invention. Like reference numerals are used in FIG. 3 to identify components that are similar in function to those identified in FIG. 2 and discussed above. The basic operation of the device shown in FIG. 3 is similar to that shown in FIG. 2 but with a modification in the bottom portion of the illustration. For example, the elastomeric diaphragm 66 is disposed above the pressure sensor die 50. The elastomeric diaphragm 66 can be provided with an opening 68 formed through its thickness. When the plunger 34 moves downward in response to a deformation of the flexible membrane 28, the second end 42 of the plunger blocks the opening 68 in the elastomeric diaphragm 66 and seals a third chamber 70 that is between the deformable portion 48 of the pressure sensor die 50 and the elastomeric diaphragm 66. Continued downward movement of the plunger 34 causes the volume of the third chamber 70 to be decreased with a resulting increase in its pressure. This increased pressure deforms the deformable portion 48 of the pressure sensor die 50 and can be sensed by the deflection of its piezoresistors. When the plunger 34 returns upward in response to a decrease in the pressure of the first chamber 24, the opening 68 is again unblocked and the pressure within the third chamber 70 can be equalized to that of ambient pressure. If this pressure equalization is not required in certain applications of the device, the opening 68 in the elastomeric diaphragm 66 is not a requirement of this particular embodiment of the present invention.

FIG. 3 also shows a device 80 which can be used to adjust the full scale output of the sensor and prevent excessive downward movement of the plunger 34. It can comprise an eccentric screw that cooperates with the lower surface of the first end 40 of the plunger to constrain the movement of the plunger.

FIGS. 2 and 3 illustrate two alternative embodiments of the present invention. The embodiment shown in FIG. 2 disposes the second end 42 of the plunger in direct force transmitting relation with the deformable portion of the pressure sensor die 50. The embodiment shown in FIG. 3 places an elastomeric membrane 66 between the second end 42 of the plunger and the pressure sensor die 50.

FIG. 4 illustrates an embodiment of the present invention that is particularly adapted to be used in flowthrough pressure sensor applications. The operation of the device shown in FIG. 4 is generally similar to that shown in FIG. 2. A housing 120 is shaped to define a second chamber 26. The housing 120 is also shaped to cooperate with a conduit housing 124 in such a way that a flexible membrane 28 can be captured between the two components. The first end 40 of the plunger 34 is disposed directly below and proximate the flexible membrane 28. The plunger 34 is disposed in a tubular opening within the housing 120 and the second end of the plunger 34 is disposed in direct contact with a pressure sensor die 50. The pressure sensor die 50 in FIG. 4 is not etched to form the thin diaphragm as described above in conjunction with FIGS. 2 and 3. Instead, a slab die is used. The entire slab pressure sensor die 50 is deformed by contact with the second end of the plunger 34. An insert portion 130 is used in cooperation with the lower end of the housing 120 to facilitate assembly of the pressure sensor die, the seal and the die support. Other than slight changes in the physical configuration of the pressure sensor components shown in FIG. 4, it operates in a manner generally similar to that of the device shown in FIG. 2. A fluid passing in the direction represented by the arrows in FIG. 4 will transmit its pressure to the upper surface of the flexible membrane 28. This will cause the membrane 28 to deflect and push downward against the first end 40 of the plunger 34. This downward movement of the plunger 34 will press against the pressure sensor die and provide the appropriate signals.

The embodiment shown in FIG. 4 is particularly useful in conjunction with components that require isolation between the fluid being measured and the pressure sensor components. If for example, the sensor is used to measure the pressure of a body fluid passing in the directions represented by the arrows, the body fluid is prevented from direct contact with the plunger or any of the pressure sensor components. When a patient is finished with the use of the device shown in FIG. 4, the conduit housing portion 124 can be removed along with the flexible membrane 28. These component can be discarded and replaced by clean components. A next patient can use the apparatus without fear of contamination from possible diseases that are borne in the fluid of a previous patient. If the flexible membrane and conduit portion permits several cleanings and uses before being discarded, the geometry of the present invention facilitates this type of procedure.

The embodiment shown in FIG. 5 is generally similar in operation to that shown in FIG. 3, but accompanied with a flowthrough conduit housing 124. The second end 42 of the plunger 34 moves downward in contact with the opening of the elastomeric diaphragm 66 as described above. When the patient is finished with the use of the apparatus, the conduit housing 124 and the flexible membrane 28 can be discarded and replaced by new components for a subsequent patient.

The present invention allows several adaptations of its basic concepts as described above and illustrated in the figures. Among these adaptations are changes in the size of the first end 40 of the plunger 34. The examples discussed above all show a first end 40 that is larger than the second end 42. This provides a pressure amplifying result that enhances the output signal from the pressure sensor die 50 for low pressure fluids being measured.

Figure 6:
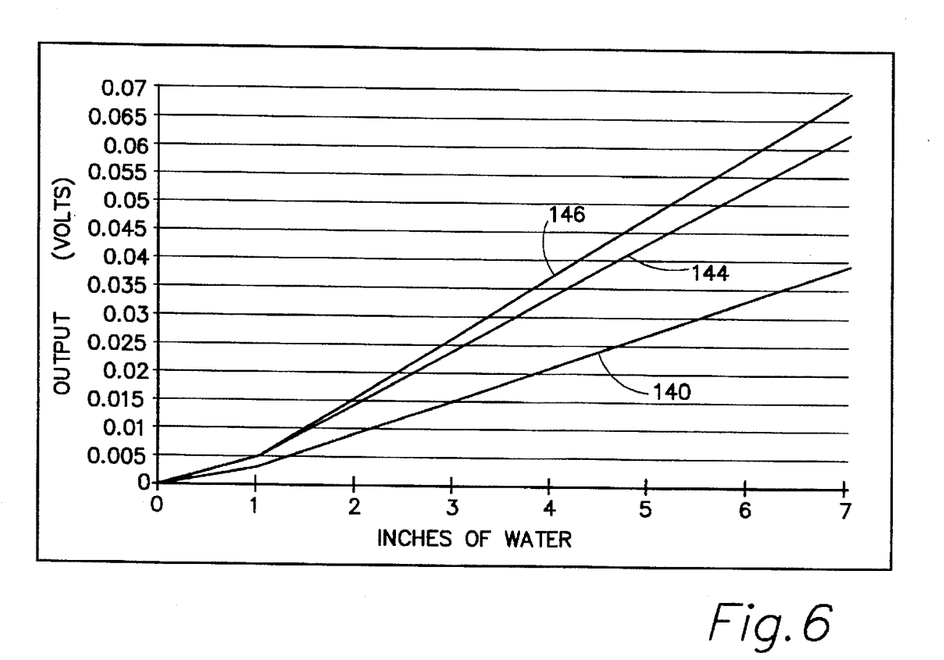
FIGS. 6 and 7 show pressure outputs for various fluid pressures resulting from empirical tests of prototypes of the present invention.

FIG. 6 illustrates the results of empirical studies made with prototype devices. For example, the diameter of the first end 40 of the plunger can be changed to provide different levels of amplification. In FIG. 6, curve 140 represents the relationship between the pressure of a measured fluid, measured in inches of water, and the output signal, in millivolts, from the pressure sensor die 50. Curve 140 was produced with a plunger having a first end 40 that is 0.375 inches in diameter. Curve 144 was produced by using a plunger with a first end 40 of 0.550 inches and curve 146 was produced using a plunger having a first end 40 of 0.660 inches in diameter. FIG. 6 illustrates the relationship between the diameter of the first end 40 and the resulting signal. It also shows the different levels of magnification that can be produced by employing various embodiments of the present invention.

Figure 7:
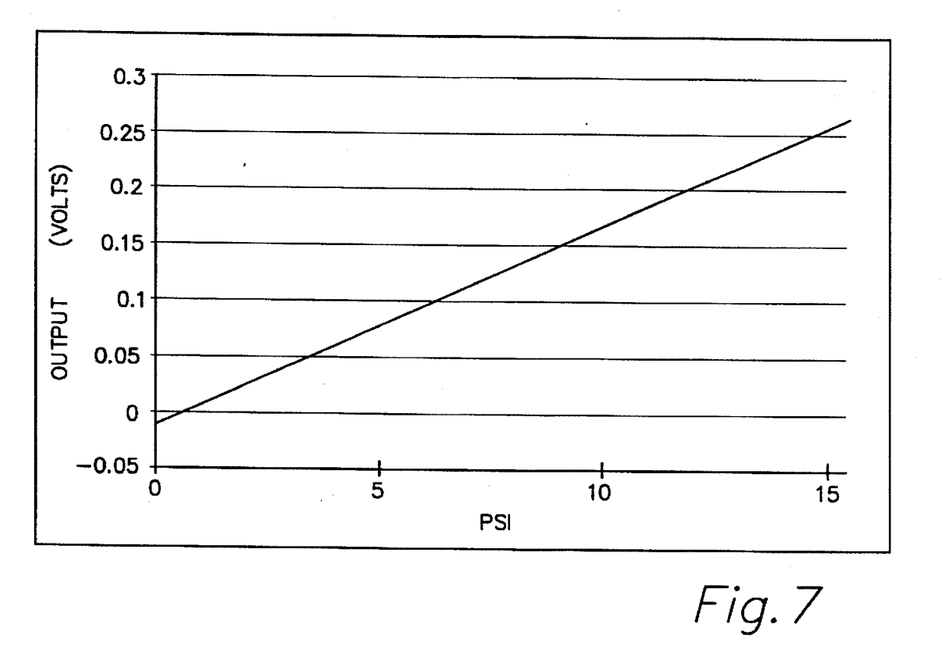

The relationship shown in FIG. 7 results from an empirical test made with a prototype of the present invention in which pressures, measured in pounds per square inch, were used in association with a pressure sensor die 50 which was not etched to produce a diaphragm surface. Instead, a slab die was used. The higher pressures used in the empirical test shown in FIG. 7 illustrate that the basic concept of the present invention are suitable in both low and higher pressure applications. They also illustrate that varying degrees of amplification can be achieved by use of the present invention.

The tests represented in FIG. 6 were done with a die having a diaphragm which was 0.004 inches thick. FIG. 7 shows the results with a slab die that was not etched to provide a diaphragm as a deformable portion.

Although several different and distinct embodiments of the present invention are illustrated in the figures and described above, it should be understood that many other embodiments are possible within the scope of the present invention. The basic concept of the present invention is that a flexible membrane is used to isolate the fluid being measured from the components of the pressure sensor. In addition, a plunger is associated with the flexible membrane to transmit a force from the flexible membrane to a pressure sensor die. The pressure sensor die can either be a slab die or one that is etched to provide a diaphragm. Other possible pressure sensing components can be used in conjunction with the present invention as long as deflection of the component results in a signal that is representative of the pressure causing the deflection. Many different embodiments of the present invention can be achieved which are useable in conjunction with applications that require disposable portions of the system. In other words, the portions of the devices shown in FIGS. 4 and 5 and identified by reference numerals 124 and 28 are disposable after use. The present invention provides two significant advantages which include both the signal amplification characteristic and the media isolation characteristic.

The embodiments of the present invention described above provide a pressure sensor that performs two important functions. First, it enables the pressure sensor to mechanically amplify a low pressure to provide an enhanced signal from the pressure sensor die 50. In addition, the flexible membrane 28 isolates the components of the pressure sensor from the fluid being monitored. In other words, the pressure of a low pressure fluid can be measured without contaminating the components of the pressure sensor with the fluid. As described above, this feature can be particularly beneficial if the measured fluid is a body fluid or other type of fluid which could contaminate the plunger, pressure sensor die, conductive seal or other portions of the pressure sensor.

In a typical application of a pressure sensor, the pressure sensor die 50 provides a null output at atmospheric pressure because the deformable portion 48 of the pressure sensor die 50 is not deformed at atmospheric pressure. However, certain applications of pressure sensors require the ability to measure both positive and negative pressures, relative to atmospheric pressure. For example, if pressure sensors of the type described and illustrated above are used in conjunction with a kidney dialysis machine, it is advantageous if the pressure sensor is able to measure changes in pressure both above and below atmospheric pressure. Certain embodiments of the present invention are able to provide the advantageous features of mechanical pressure amplification and media isolation in a pressure sensor which is also able to measure both positive and negative pressures.

Figure 8:
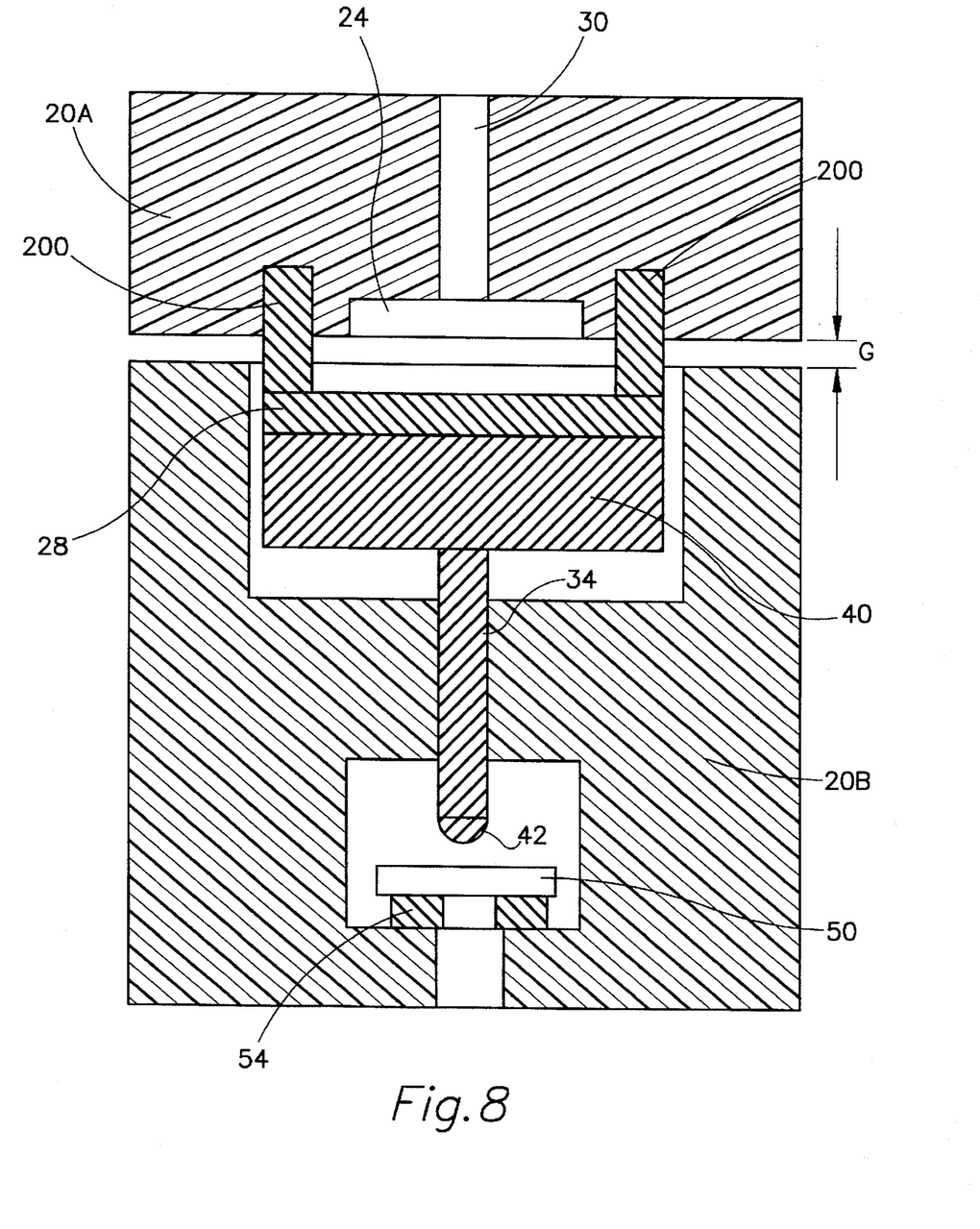
FIG. 8 is an adaptation of the present invention that is particularly configured to provide the pressure transducer with the ability to measure negative pressures.

FIG. 8 illustrates a schematic representation of one embodiment of the present invention which can measure negative deviations in pressure relative to atmospheric pressure. It should be clearly understood that the illustration in FIG. 8 is high schematic and is used for the purposes of describing the physical operation of the present invention. Specific preferred embodiments will be described below after the operational discussion in conjunction with FIG. 8.

FIG. 8 shows a first portion 20A of the housing member and a second portion 20B of the housing member displaced from each other for the purposes of this description. The positions of the plunger 34 with its first end 40 and second end 42 are generally similar to those described above. Similarly, the pressure sensor die 50 and the conductive seal 54 operate in the manner discussed above. A difference of the device shown in FIG. 8 from the embodiments described above is the presence of an resilient member 200 attached to the flexible membrane 28. The resilient member 200 is provided to exert a downward force on the plunger 34 when the second portion 20B is attached to the first portion 20A. In other words, when the two portions of the housing member are moved together to eliminate gap G, the resilient member 200 is compressed and provides a downward force against the first portion 40 of the plunger 34. This downward force is transmitted to the deformable portion 48 of the pressure sensor die 50. Even when the first opening 30 is subjected to atmospheric pressure, a deformation of the deformable portion 48 of the pressure sensor die 50 will exist. It should be understood that the embodiment of the present invention illustrated in FIG. 8 can be used with any of the embodiments described above. In other words, the pressure sensor die 50 can be a slab die or a die which has been etched to provide a diaphragm. In addition, the embodiment of the present invention illustrated in FIG. 8 can also be associated with an elastomeric diaphragm 66 described above. The illustration in FIG. 8 could therefore also include a third chamber disposed between a pressure sensor die 50 and an elastomeric diaphragm 66. The distinction between the embodiment shown in FIG. 8 and those described above is that a means is provided to exert a downward force on the pressure sensor die 50 even when the pressure sensor is subjected to atmospheric pressure.

The resilient member 200 can be of an annular shape and attached to the upper surface of the flexible membrane 28. Alternatively, it can be formed as an integral portion of the flexible membrane 28. When the second portion 20B of the housing member is moved into contact with the first portion 20A of the housing member, the resilient member 200 is compressed and the compression force causes a downward force of the plunger 34. The lower surface of the first portion 20A, which is moved into contact with the upper surface of the second portion 20B, has an annular groove formed in it to receive the resilient member 200. In certain embodiments of the present invention, the resilient member 200 forms a seal around the first chamber 24 and prevents fluid communication between the first chamber 24 and the components of the pressure sensor die contained within the second portion 20B of the housing member. It has been determined that the operation of the device illustrated in FIG. 8 is significantly enhanced by the firm attachment of the flexible membrane 28 to the first end 40 of the plunger 34.

Figure 9:
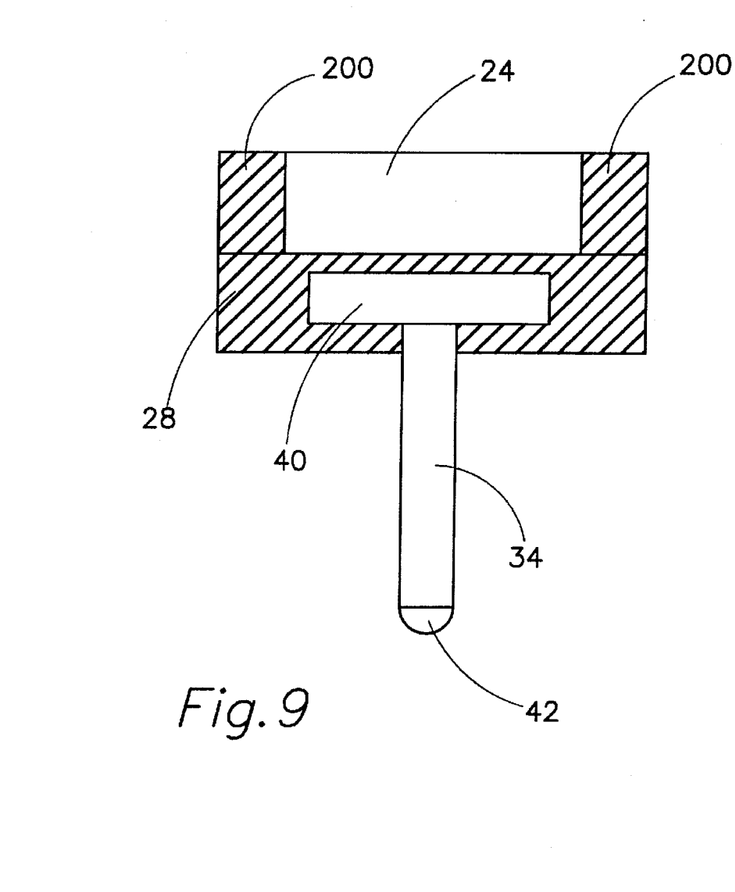
FIGS. 9 and 10 are alternative configurations of the flexible membrane used in the pressure transducer shown in FIG. 8.

As discussed above, the illustration in FIG. 8 is schematic and intended to show the functional position of the components of the embodiment. FIG. 9 shows one preferred embodiment of the plunger 34, the flexible membrane 28 and the resilient member 200. In the embodiment of FIG. 9, the first end 40 of the plunger 34 is encapsulated within the flexible membrane 28. In addition, the diameter of the first end 40 is slightly less than the inside diameter of the annular resilient member 200. It has been determined that the operation of the present invention is significantly improved if the diameter of the first end 40 is less than the inside diameter of the annular resilient member 200. This permits more flexibility and deformation of the flexible membrane 28. If the diameter of the first end 40 is larger than the relative size shown in FIG. 9, the flexible membrane 28 is too stiff to provide the necessary sensitivity in certain applications. For purposes of illustration, the components in FIG. 9 are not all drawn to scale. For example, the flexible membrane 28 is illustrated as being significantly thicker than normal in most embodiments of the present invention.

Figure 10:
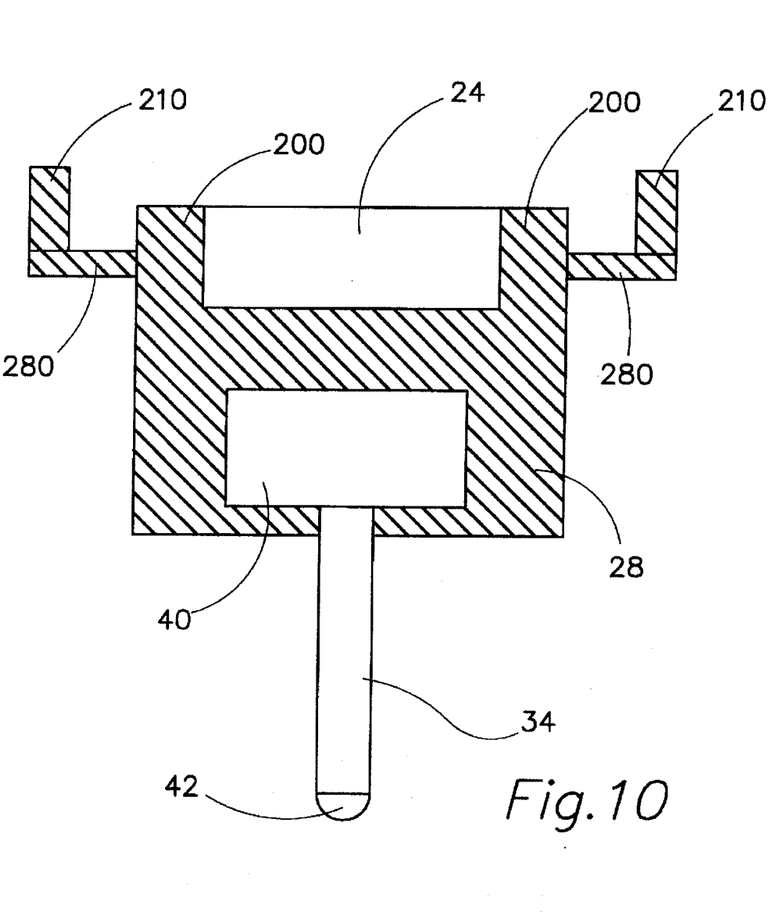

FIG. 10 shows an alternative shape of the plunger 34 and flexible member 28. The resilient member 200 shown in FIG. 10 is not necessarily intended to provide a sealing function for the first cavity 24. In certain applications of the present invention, the resilient member 200 is used solely to provide the preload force on the plunger 34 and is not intended to also provide an additional sealing function. The embodiment in FIG. 10 utilizes the annular seal 210 for these purposes. When the device illustrated in FIG. 10 is used in a pressure sensor, the first portion 20A of the housing member is shaped to provide two annular grooves in its lower surface. One annular groove is shaped to receive the resilient member 200 and the other annular groove is shaped to receive the seal 210. The seal 210 provides sealing of the first chamber 24 and prevents fluid communication between the first chamber 24 and other components of the pressure sensor. The resilient member 200 is intended to provide the preload force. When the resilient member 200 is not intended to provide a sealing function, it can be castellated to permit free flow in an annular direction through the resilient member 200.

In all of the embodiments of the present invention shown in FIGS. 8, 9 and 10, the assembly of the first portion 20A to the second portion 20B compresses the resilient member 200 and preloads the pressure sensor die 50 by forcing the plunger 34 downward against the die even when the pressure sensor is subjected only to atmospheric pressure. This preload can be used to permit the pressure sensor die to sense both position and negative pressures. As an example, if the pressure within the first chamber 24 is reduced to a magnitude which is less than atmospheric pressure, the plunger 34 is actually caused to move in an upward direction to reduce its force against the pressure sensor die 50. In effect, this pressure in the first chamber 24 can remove a portion of the preload when it is less than atmospheric pressure.

With continued reference to FIG. 10, the extension 280 between the resilient member 200 and the annular seal 210 provides a flexibility which allows the flexible member 28 to respond to changes in pressure within the first chamber 24. When the thickness of the flexible member 28 is increased for certain specific applications of the present invention, the extension 280 can provide the required flexibility which permits the flexible member 28 to operate in the intended manner described above. The use a castellated resilient member 200 also increases the effective area of the flexible member 28 on which the measured pressure can operative. In other words, if the resilient member 200 is provided with flutes, the pressure being measured can operate on the area confined within the sealing member 210.

With reference to FIGS. 9 and 10, it should be understood that the flexible membrane 28 must be able to deform in response to changes in pressure within the first chamber 24. In FIG. 9, this deformation is likely to take place within the flexible membrane 28 between the outer diameter of the first end 40 and the inner diameter of the resilient member 200. In FIG. 10, this deformation is likely to take place within the extension 280. The specific location of the deformation within the flexible membrane 28 depends on the relative sizes of the resilient member 200, the thickness of the flexible membrane 28 and the shape and size of the first end 40. It also depends on whether the resilient member 200 is castellated and provided with an additional annular seal 210.

Figure 11:
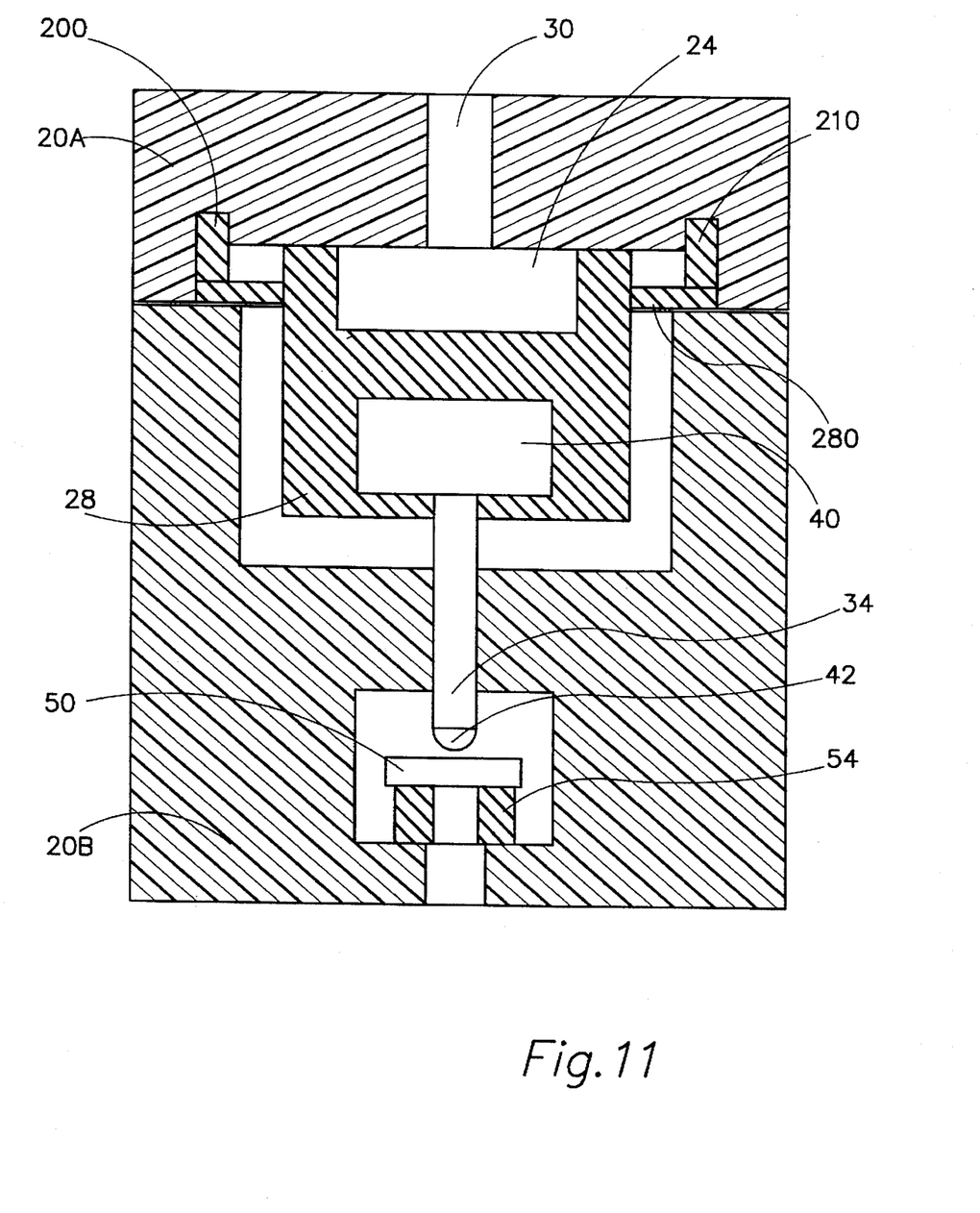
FIG. 11 shows the embodiment of FIG. 10 disposed within a housing member.

FIG. 11 illustrates the embodiment shown in FIG. 10 disposed within a housing member. It should be understood that the relative dimensions of the components shown in FIG. 11 are not intended to be to scale but, instead, are intended to illustrate the relative positions of the components in one embodiment of the present invention. The annular seal 210 is disposed within an annular groove formed in the lower surface of the first portion 20A of the housing member. If the resilient member 200 is castellated, fluid is permitted to flow from the first opening 30 to the first chamber 24 and radially through flutes formed in the annular member 200 to the region shown between the outer diameter of the annular member 200 and the inner diameter of the annular seal 210. When the first and second portions of the housing member are assembled together, the resilient member 200 is forced against the upper surface of the first chamber 24 and compressed. In the embodiment shown in FIG. 11, this compression can affect both the flexible membrane 28 and the extension portion 280. Regardless of the precise effect of this compression, a downward force is provided on the plunger 34 against the pressure sensor die 50. It should be understood that, although the resilient member has been specifically illustrated as being disposed above the flexible membrane 28, it can be provided in many different forms. In fact, the function of the resilient member can be performed by any type of component that provides the capability of being deformed in response to the attachment of the first and second portions of the housing member. Regardless of the particular configuration and position of the resilient member 200, its function in the present invention is to provide a downward force against the plunger 34 toward the pressure sensor die 50 in response to the attachment of the first and second portions of the housing member.

The relative sizes and shapes of the resilient member 200, the annular seal 210, the flexible membrane 28 and the plunger 34 are determined to result in the deformation of the deformable portion 48 of the pressure sensor die 50 when the first and second portions of the housing member are attached together. In other words, the effective distance between the upper surface of the resilient member 200 and the lower surface of the second end 42 of the plunger 34 should be larger than the effective distance between the upper surface of the deformable portion 48 of the pressure sensor die 50 and the lower surface of the first housing portion 20A against which the resilient member is in contact. When the two portions of the housing member are assembled together and attached to each other, the effective shape of the flexible membrane 28 is changed. This change is caused by the contact between the upper surface of the resilient member 200 and the lower surface of the first chamber 24 within the first portion 28 of the housing member. Regardless of whether the extension portion 280 deforms or the main portion of the body of the flexible membrane 28 deforms, the resulting effect is that the plunger 34 is pushed downward against the pressure sensor die 50 to preload it upon assembly of the first and second portions of the housing member even when the pressure within the first opening 30 is atmospheric pressure.

Figure 12:
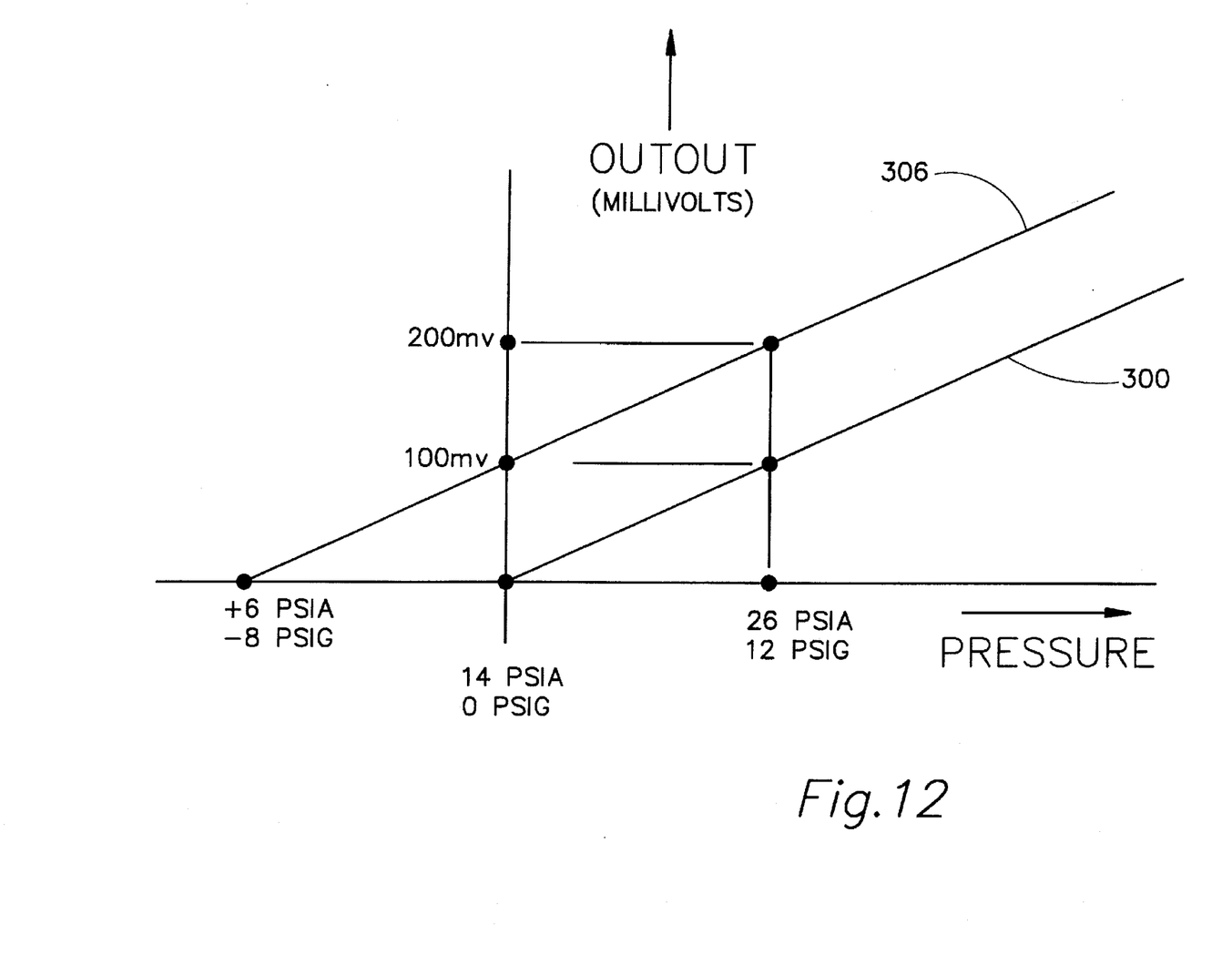
FIG. 12 is a graphical representation of the freeloading capability of the present invention.

FIG. 12 illustrates the effect of the preloading of the pressure sensor die 50 as a result of the force provided on the plunger 34 by the relationship between the resilient member 200 and the first portion 20A of the housing member. In FIG. 12, line 300 shows the relationship between the output from the pressure sensor die 50, measured in millivolts, and the pressure within the first chamber 24 of the fluid being measured. Although line 300 does not necessarily have to pass through the origin in FIG. 12 and provide a zero voltage output at atmospheric pressure, line 300 represents the fact that in typical applications the pressure sensor die is not deformed at atmospheric pressure. In the hypothetical example represented in FIG. 12, line 300 indicates that a null output of zero millivolts is provided as the output signal from the pressure sensor die 50 when the pressure sensor is subjected to atmospheric pressure of zero pounds per square inch gauge. Upon an increase in the pressure of the measured fluid, the output from the pressure sensor die 50 increases. As an example, when the pressure within the first opening 30 is 12 PSIG, an output signal of 100 millivolts is provided. This relationship is represented by line 300. It should be noted that, with respect to FIG. 12, the pressure sensor die is not configured to provide a negative output voltage signal.

With continued reference to FIG. 12, line 306 represents the relationship of output signal to measured pressure after the plunger is forced downward against the pressure sensor die in response to corresponds to compression of the resilient member 200. As a result of this preload on the deformable portion 48 of the pressure sensor die, the output signal from the pressure sensor die is approximately 100 millivolts when the fluid within the first chamber 24 is at atmospheric pressure. As a result of the relationship represented by line 306, a pressure of −8 PSIG provides an output signal of approximately 0 millivolts. Because of the preload on the pressure sensor die, a positive output voltage is provided by the pressure sensor die in response to a range of pressures that includes both positive and negative pressures. As a result, a negative pressure within the first chamber 24 can be determined from an output signal which is less than 100 millivolts in this example.

As a result of the embodiment of the present invention illustrated in FIGS. 8–11, a pressure sensor can be provided which is useable in applications where both positive and negative pressures must be measured. This capability is provided by the preload force of the plunger 34 on the deformable portion 48 of the pressure sensor die 50 in response to the force provided by the resilient member 200 as a result of its compression between the first end 40 of the plunger 34 and the surface of the first portion 20A of the housing member. The advantage of this preload is illustrated in FIG. 12.

Figure 13:
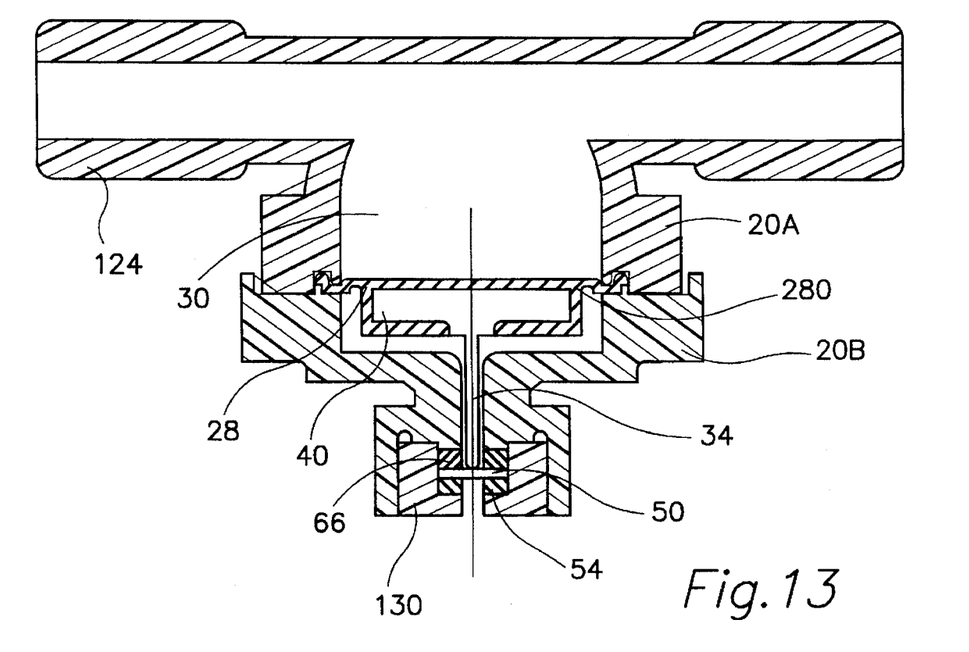
FIGS. 13 and 14 are alternative embodiments of the present invention.
Figure 14:
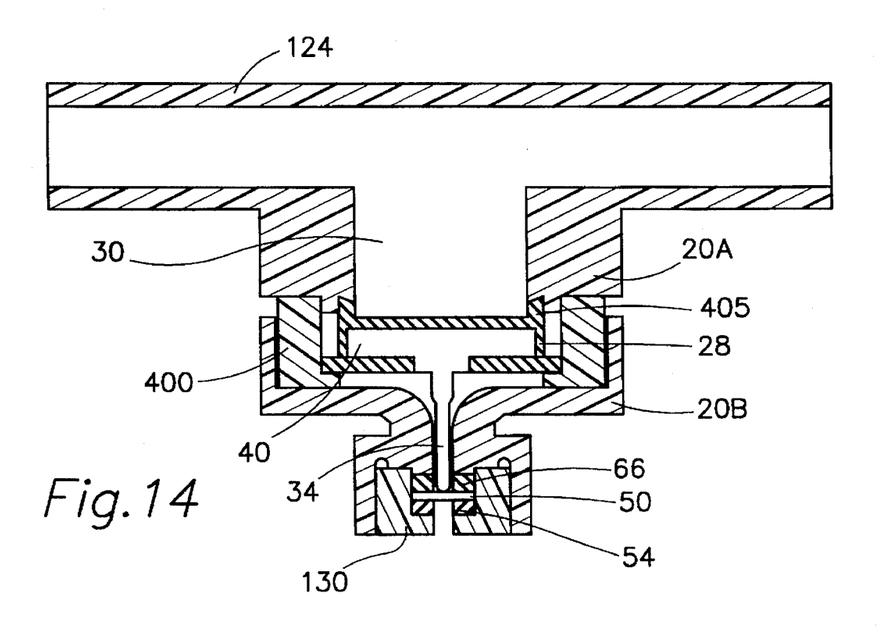

FIGS. 13 and 14 show alternative configurations of the present invention. The differences between the configurations in FIGS. 13 and 14 and those described above are primarily in the shapes of the various component parts of the pressure transducer. The flexible membrane 28 in FIG. 13 is captured between the upper housing portion 20A and the lower housing portion 20B, as shown. The change in pressure within the conduit 30 causes the flexible membrane 28 to move up or down. The embodiment shown in FIG. 14 comprises a structure 400 that is attachable to the upper housing member 20A by some means, such as a snap on feature. When the structure 400 is attached to the upper housing member 20A, the flexible membrane 28 is captured between the structure 400 and the upper housing member 20A. As can be seen, conduit 30 has cylindrical walls that are generally aligned with the cylindrical upper cavity of the flexible membrane 28. This is done so that the structure is easily flushable between uses prior to its being discarded permanently. In other words, the device shown in FIG. 14 comprises the plunger 34, the flexible membrane 28, structure 400 and the upper housing portion 20A which can possibly be contaminated during use. Those members, as a unitary structure, can be removed from the other components shown in FIG. 14 and washed. In certain applications, these component can be flushed clean several times prior to their being discarded. In applications where flushing is to be used, it is advantageous if the design avoids the creation of cavities or pockets in which contaminated material can collect. If this collection of contaminated material is permitted, the flushing process may not completely clean the structure. The lower housing portion 20B, in which the pressure sensor die 50 and related components are contained, can be removed from the other portions of the system shown in FIG. 14 and attached to another similar structure. When this is done, the lower housing portion 20B can be provided with a bayonet-type fitting that allows it to be quickly attached to the upper housing portion 20A. This places the plunger 34 in contact with the pressure sensor die 50. If the pressure sensor is provided with the negative pressure reading capability, the upper portion 405 of the flexible membrane 28 can be sized to provide the downward force against the pressure sensor die 50 as described above. This downward force would be caused by the attachment of the lower housing portion 20B to structure 400.

Throughout the description of the various embodiments of the present invention, certain components were described in a specific manner to illustrate and discuss a particularly preferred embodiment of the present invention. It should be understood that these descriptions are not limiting to the present invention and that alternative embodiments are also within its scope. For example, the component identified by reference numeral 54 is described as possibly being made of an elastomeric material that is conductive through its thickness. These types of materials are well known to those skilled in the art and is disclosed in the references described above in the description of the prior art. However, it should be understood that this particular component could be made of a ceramic material and could be lacking in the ability to conduct signals through its thickness. In other words, the pressure sensor die 50 could be attached to a ceramic die support 54 and could be connected in electrical communication with other components through the use of wire bonds or other techniques. In addition, although a preferred embodiment of the present invention utilizes an elastomeric material as the resilient member 200, alternative resilient components could be used as long as they are able to perform the function of exerting a force on the plunger 34 in the direction of the pressure sensor die 50 when the first and second portions of the housing are attached together. In other words, the primary function of the resilient member 200 is to preload the sensor die even when the pressure sensor is subjected to only atmospheric pressure. This preload provides the relationship represented by line 306 in FIG. 12.

The embodiments of the invention in which an exclusive property or right is claimed are defined as follows:

1. A pressure sensor, comprising:
    a housing member having a first chamber and a second chamber;

a flexible membrane disposed between said first and second chambers;

a first conduit being connected in fluid communication with said first chamber;

a tubular opening in said housing member;

a plunger slideably disposed within said tubular opening, said plunger having a first end and a second end, said first end of said plunger being disposed within said second chamber and being disposed proximate said flexible membrane, said flexible membrane being movable into contact with said plunger, said plunger being movable within said tubular opening in response to movement of said flexible membrane, at least a portion of said flexible membrane being separable from said first end of said plunger and movable away from said first end of said plunger in response to a first pressure within said first chamber which is less than a second pressure within said second chamber, said housing member permitting said flexible membrane to be removed from said housing member without removing said plunger from said housing member;

a pressure sensor die disposed within said housing member proximate said second end of said plunger, said pressure sensor die having a deformable portion which is deformable in response to movement of said plunger;

a diaphragm disposed between said second end of said plunger and said deformable portion of said pressure sensor die, said diaphragm has an opening formed through its thickness, said diaphragm opening being disposed proximate said second end of said plunger, said plunger being movable into contact with said diaphragm in response to movement of said flexible membrane; and a third chamber disposed between said pressure sensor die and said diaphragm, said third chamber being sealed from fluid communication with said tubular opening when said second end of said plunger is moved into contact with said diaphragm in response to movement of said flexible membrane, said pressure sensor die being responsive to pressure changes of the fluid within said third chamber.

2. The pressure sensor of claim 1, wherein:

said flexible membrane is fluid impermeable, said flexible membrane preventing fluid communication between said first and second chambers.

3. The pressure sensor of claim 1, wherein:

said first end of said plunger is larger in cross section than said second end of said plunger.

4. The pressure sensor of claim 1, wherein;

said second end of said plunger is in direct contact with said deformable portion of said pressure sensor die.

5. The pressure sensor of claim 1, further comprising:

a second conduit connected in fluid communication with said first conduit.

6. The pressure sensor of claim 5, wherein:

said second fluid conduit is connected in parallel fluid communication with said first fluid conduit.

7. A pressure sensor, comprising:

a housing member having a first chamber and a second chamber;

a flexible membrane disposed between said first and second chambers;

a first conduit connected in fluid communication with said first chamber;

a tubular opening in said housing member;

a plunger slideably disposed within said tubular opening, said plunger having a first end and a second end, said first end of said plunger being disposed within said second chamber and being disposed proximate said flexible membrane, said flexible membrane being movable into contact with said plunger, said plunger being movable within said tubular opening in response to movement of said flexible membrane, at least a portion of said flexible membrane being separable from said first end of said plunger and movable away from said first end of said plunger in response to a first pressure within said first chamber which is less than a second pressure within said second chamber, said housing member permitting said flexible membrane to be removed from said housing member without removing said plunger from said housing member;

a pressure sensor die disposed within said housing member proximate said second end of said plunger, said pressure sensor die having a deformable portion which is deformable in response to movement of said plunger, said flexible membrane being fluid impermeable, said flexible membrane preventing fluid communication between said first and second chambers; and an elastomeric diaphragm disposed between said second end of said plunger and said deformable portion of said pressure sensor die, said elastomeric diaphragm has an opening formed through its thickness, said diaphragm opening being disposed proximate said second end of said plunger, said plunger being movable into contact with said elastomeric diaphragm in response to movement of said flexible membrane;

a third chamber disposed between said pressure sensor die and said elastomeric diaphragm, said third chamber being sealed from fluid communication with said tubular opening when said second end of said plunger is moved into contact with said elastomeric diaphragm in response to movement of said flexible membrane, said pressure sensor die being responsive to pressure changes of the fluid within said third chamber.

8. The pressure sensor of claim 7, wherein:

said first end of said plunger is larger in cross section than said second end of said plunger.

9. The pressure sensor of claim 7, wherein;

said second end of said plunger is in direct contact with said deformable portion of said pressure sensor die.

10. The pressure sensor of claim 7, further comprising:

a second conduit connected in fluid communication with said first conduit.

11. The pressure sensor of claim 10, wherein:

said second fluid conduit is connected in parallel fluid communication with said first fluid conduit.

12. A pressure sensor, comprising:

a housing member having a first chamber and a second chamber;

a flexible membrane disposed between said first and second chambers;

a first conduit connected in fluid communication with said first chamber;

a tubular opening in said housing member;

a plunger slideably disposed within said tubular opening, said plunger having a first end and a second end, said first end of said plunger being disposed within said second chamber and being disposed proximate said flexible membrane, said flexible membrane being movable into contact with said plunger, said plunger being movable within said tubular opening in response to movement of said flexible membrane, at least a portion of said flexible membrane being separable from said first end of said plunger and movable away from said first end of said plunger in response to a first pressure within said first chamber which is less than a second pressure within said second chamber, said housing member permitting said flexible membrane to be removed from said housing member without removing said plunger from said housing member;

a pressure sensor die disposed within said housing member proximate said second end of said plunger, said pressure sensor die having a deformable portion which is deformable in response to movement of said plunger, said flexible membrane being fluid impermeable, said flexible membrane preventing fluid communication between said first and second chambers;

an elastomeric diaphragm disposed between said second end of said plunger and said deformable portion of said pressure sensor die, said elastomeric diaphragm having an opening formed through its thickness, said diaphragm opening being disposed proximate said second end of said plunger, said plunger being movable into contact with said elastomeric diaphragm in response to movement of said flexible membrane;

a third chamber disposed between said pressure sensor die and said elastomeric diaphragm, said third chamber being sealed from fluid communication with said tubular opening when said second end of said plunger is moved into contact with said elastomeric diaphragm in response to movement of said flexible membrane, said pressure sensor die being responsive to pressure changes of the fluid within said third chamber; and a second conduit connected in fluid communication with said first conduit, said second fluid conduit is connected in parallel fluid communication with said first fluid conduit.

13. The pressure sensor of claim 12, wherein:

said first end of said plunger is larger in cross section than said second end of said plunger.

14. The pressure sensor of claim 12, wherein;

said second end of said plunger is in direct contact with said deformable portion of said pressure sensor die.

* * * * *